Oct. 3, 1961  R. E. BUCK  3,002,896
PROCESS FOR CONTINUOUS CONCENTRATION OF VINEGAR
Filed March 20, 1958  2 Sheets-Sheet 1

INVENTOR.
ROBERT E. BUCK.
BY
ATTORNEYS.

United States Patent Office 3,002,896
Patented Oct. 3, 1961

3,002,896
PROCESS FOR CONTINUOUS CONCENTRATION OF VINEGAR
Robert E. Buck, Coraopolis, Pa., assignor to H. J. Heinz Company, Pittsburgh, Pa., a corporation of Pennsylvania
Filed Mar. 20, 1958, Ser. No. 722,772
4 Claims. (Cl. 202—67)

This invention is for a method of and apparatus for concentration of vinegar in such manner that a concentrate is produced of a character that it may be remixed with water and used for all purposes for which the original vinegar could have been used, and particularly it is for a continuous process as distinguished from a batch process.

It is well known that vinegar is produced by contacting a mixture of alcohol and water with acetobacter in the presence of air under such conditions that the alcohol is oxidized to acetic acid. The mixture of alcohol and water which is used may be a fermented fruit juice, or it may be prepared by diluting commercial ethyl alcohol with water. The resulting product is primarily a relatively dilute solution of acetic acid in water, although of substantially higher concentration than "table" vinegar sold for household use.

Vinegar, whether made from alcohol or from fermented fruit juice, contains certain characteristic aromatic constituents, mainly esters, which are important to the flavor and aroma of the vinegar.

For various reasons vinegar may be used or bottled for sale at points remote from the source of manufacture. The cost of transporting, as well as storing the bulk product, are important factors in determining the cost of the product and the profit to the manufacturer.

The principal object of this invention is to provide a method of and apparatus for concentrating the vinegar after it has been manufactured, but without degrading it through the loss of the characteristic aromatic constituents, thereby providing concentrate which may be reconstituted by the addition of water when the product is to be used. A further object of my invention is to provide a continuous method and apparatus which is economical. By concentrating the vinegar and substantially reducing its water content, the concentrate can be more economically shipped from the place of manufacture to the point where it is to be used or bottled, and it can be then reconstituted as needed. Shipping cost is reduced, storage space is saved, and an additional useful product is produced.

Figure 1:
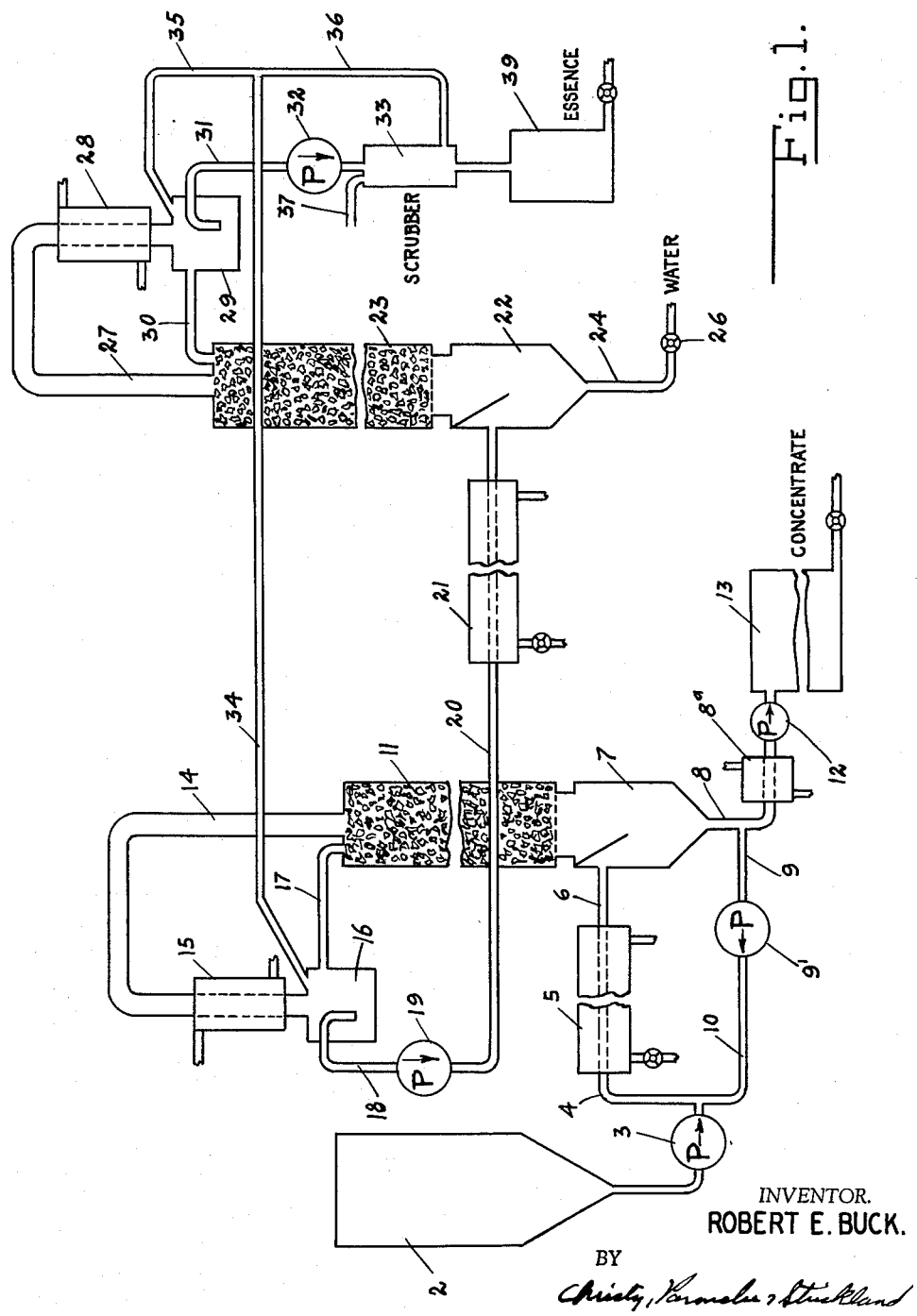
Figure 2:
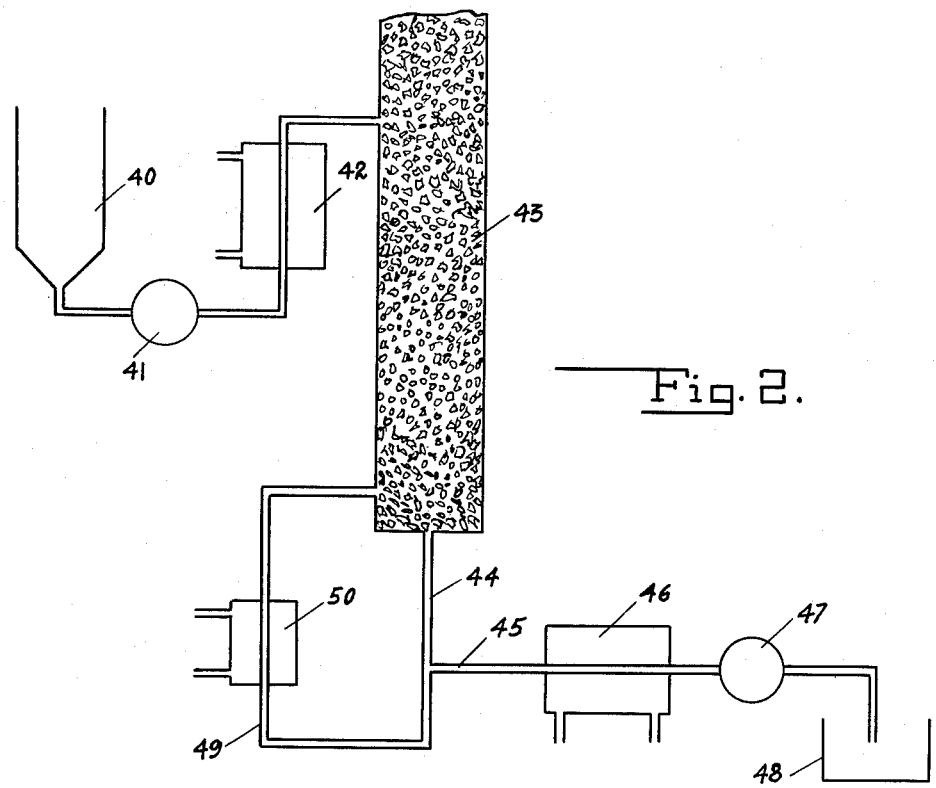

Many dilute substances may be concentrated by a simple process of evaporation, but with vinegar the acetic acid and water cannot be easily separated. The present invention therefore employs a process of continuous fractional distillation as hereinafter more fully described in conjunction with the accompanying drawings in which:

FIG. 1 is a diagrammatic view of one form of an apparatus for the practice of my method; and FIG. 2 is a fragmentary view of another form of a part only of the apparatus.

In FIG. 1 of the drawing, 2 is a supply reservoir into which vinegar to be processed is delivered, and from which it is removed at a constant predetermined rate by a pump 3 that forces the vinegar into a pipe 4 that extends through a steam jacketed heat exchanger 5 where the vinegar is heated with steam by heat transfer through the walls of the heat exchanger. The product is sufficiently heated to vaporize a portion of the vinegar in the flash chamber 8a, while the flash chamber has a drain pipe 8 at the bottom. A pipe 9 in which there is a pump 9' drains part of the liquid product or residue from the flash chamber, and this portion is forced by the pump through pipe 10 to mingle with the fresh vinegar entering the system to be recirculated.

The vapor from the flash chamber flows out the top of the flash chamber into a fractionating column 11 filled with small porcelain pieces known as "porcelain saddles," glass balls or other usual packing. In rising through the column some of the liquid condenses and flows into the flash chamber while some of the condensate, encountering the rising column of vapor, is again vaporized, with the vapor eventually flowing out of the top of the column.

Part of the liquid flowing out the drain pipe 8 is recirculated in the manner above described, but part of it is delivered to a pump 12 which pumps it at a predetermined rate into a concentrate collecting vessel 13. Concentrate is cooled in a water jacketed cooler 8a just before entering pump 12.

At the top of the fractionating column 11 is a vapor outlet pipe 14 that discharges into a condenser 15 about which cold water is circulated. In the condenser most of the vapors are condensed and discharge into a collecting chamber 16 from which there is an overflow pipe 17 leading back to the top of the still.

There is a draw-off pipe 18 leading from the collecting chamber 16 in which is a pump 19 that removes condensate at a predetermined rate through pipe 20.

After a period of operation, the system reaches a state of equilibrium in which most of the condensate removed through the pipe 20 is water carrying most of the aromatic constituents and a small amount of acetic acid. The residue product discharged into the vessel 13 is a concentrated vinegar stripped of much of the aromatic constituents of the original vinegar.

The distillate pumped through pipe 20 passes through a heat exchanger 21 to a flash chamber 22. Above this flash chamber is a second fractionating column 23 smaller than the first, but of essentially the same construction. The flash chamber arrangement is also essentially the same, although it is unnecessary at this stage to provide for any recirculation of residue as is provided in the first stage. There is a drain pipe 24 through which some proportion of the liquid is drained from the system at a predetermined rate, a valve 25 controlling the rate of removal of the condensate.

At the top of the fractionating column 23 there is an outlet pipe 27 that discharges vapors into a water-cooled condenser 28, and the distillate from the condenser empties into a receiver or receptacle 29 having an overflow pipe 30 that discharges back into the top of the column 23 to provide a reflux.

There is a second pipe 31 leading from the receiver 29 in which is a pump 32 provided for withdrawing liquid from the receiver and discharging it into a scrubbing column 33.

In the first stage of distillation in column 11 the residue collected in the receptacle 13 is concentrated vinegar, while the distillate drawn off through pipe 18 is principally water with aromatic constituents. There may also be a small amount of acetic acid or vinegar in the distillate. In the second stage the residue discharged through pipe 26 is mainly water with a slight amount of acetic acid, and the distillate drawn off through pump 32 is a concentrate in water of the aromatic constituents and some acetic acid.

Non-condensable vapors from the first stage of distillation are removed from the top of the receiver 16 through pipe 34 and combined with non-condensable vapors from the second stage, and drawn off through pipe 35 leading from receiver 29. The combined vapors are carried through pipe 36 to the scrubber 33 where the non-condensable vapors contact the aromatic concentrate, and any soluble constituents of the vapors are there absorbed in the aromatic concentrate. The remaining gases are discharged through pipe 37.

The concentrate of aromatic constituents, termed "essence," flows from the scrubber into a collecting vessel 39 from which it may be withdrawn from time to time. It may be mixed directly into the concentrated vinegar, or shipped separately to be recombined with the vinegar when water is also added to the vinegar at the point of use to reconstitute the vinegar.

The degree of concentration can be regulated by regulating the point at which equilibrium is established and maintained. However, in many instances the water which is separated out and which contains some acetic acid may be used in pickling or other processing operations where only a weak solution is required.

As an example, in a test installation vinegar having an initial acetic acid concentration of 11.1% was pumped into the system at a rate of 1.71 gallons per hour. Concentrated vinegar at an acid concentration of 20.6% was pumped from the unit at a rate of 0.92 gallon per hour. Distillate with an acidity of 1.0% was collected at a rate of .77 gallon per hour. Essence was collected at a rate of 0.02 gallon per hour, with an acidity of 0.2%. The operation may be varied so that the distillate ranges between 1% and 5% more or less of acetic acid with good economy, depending upon whether the water fraction may be used for other purposes, or is to be wasted.

All of the individual elements of the apparatus are well known, and for this reason I believe the schematic drawing to adequately describe the same, and it will be understood that various changes in arrangement, location and design of the equipment may be made within the contemplation of my invention.

The degree of concentration and the point of equilibrium is determined by adjusting the ratio of product withdrawn from the collecting chambers 16 and 29 to the product returned to the fractionating column. The efficiency of concentration will depend on size and height of the fractionating column and the type of packing material used. It is apparent that if all of the condensate collected in chamber 16 were transferred through pipe 20, there would be a lesser recovery of acetic acid in the first stage than is secured by removing only part of the distillate from this chamber and returning part to the fractionating column. Also, the pumps 19 and 12 are so regulated as to proportion the amount of distillate withdrawn to the amount of concentrate withdrawn. Altering this proportion will alter the amounts of acetic acid collected in the distillate and concentrate collected at 13 includes some product that is initially collected in the flash chamber 7 without entering the fractionating column at all, so that no attempt is made to secure a 100% separation of acid and water, and the concentrate represents an average value, which is sufficient for my purposes where far from 100% separation is required. The recirculation rate of pump 9' is many times the rate of pump 12 so that a very small proportion of vinegar goes directly from 2 to 13.

In FIG. 2 there is shown a modification of a part only of the apparatus shown in FIG. 1. In this view, raw vinegar from the supply vessel 40 is forced by pump 41 through a heat exchanger 42 where it is heated to boiling temperature. From the heat exchanger the vinegar is discharged into the fractionating column 43 intermediate the top and bottom of the column instead of being discharged into a flash chamber as in FIG. 1.

At the bottom of the column there is a discharge pipe 44 having a branch 45 leading through a cooler 46 and pump 47 to the concentrate receiver 48. Pipe 44 also leads into a loop 49 that passes through a reboiler or heat exchanger 50 into the column 43 just above the bottom. The remainder of the system is the same as shown in FIG. 1, so that the system at and beyond the top of the column is not shown.

This system is essentially the same as in FIG. 1, except for the fact that the residue is separately heated and returned to the column instead of being mixed with the incoming vinegar, and all of the vinegar enters the column, which gives a better efficiency than FIG. 1 but requires two boilers or heat exchangers. Proportioning is accomplished by regulating the ratio of residue withdrawn through pump 47 to that which is withdrawn by pump 19 from the top of the column.

It has been found that the vinegar concentrated and reconstituted according to my invention is indistinguishable from the original whole vinegar for all usual purposes.

I claim:

1. The art of processing vinegar to produce a concentrate which can be reconstituted by the addition of water which comprises continuously subjecting vinegar to fractional distillation to produce a residue of water in which the acetic acid of the original vinegar is principally concentrated and a distillate constituted principally of water with some of the original acetic acid of the vinegar retained therein and also containing aromatic constituents of the vinegar, redistilling and fractionating said distillate to produce a second distillate in which the aromatic constituents of the original vinegar are concentrated and a residue constituted of water removed from the original vinegar stripped of most of the acetic acid and aromatic constituents of the original vinegar, and thereafter restoring the distillate-containing aromatic constituents to the residue first produced.

2. The process of treating vinegar to produce a concentrate which may be reconstituted by the addition of water thereto which comprises heating original vinegar and subjecting it to fractional distillation to secure a distillate of water from the vinegar in which the acetic acid is reduced below that of the original vinegar and which contains most of the aromatic constituents of the original vinegar, and a residue of water from the original vinegar in which most of the acetic acid of the original vinegar is concentrated, recycling some of the residue and proportionally removing some of it as finished concentrate, refluxing some of the distillate and subjecting some of it to a second stage of fractional distillation to secure a second distillat in which the aromatic constituents are concentrated, refluxing some of the last-named distillate, withdrawing some of the last-named distillate as final product, restoring the last-named final product to the finished concentrate first removed and discharging the residue of said second distillation from the system.

3. The process of treating vinegar to produce a concentrate which may be reconstituted by the addition of water thereto as defined in claim 2 in which uncondensed vapors from both stages of fractional distillation are contacted with the second distillate after it is withdrawn.

4. The process of treating vinegar to produce a concentrate which may be reconstituted by the addition of water thereto as defined in claim 2 in which the rate of refluxing of distillate and recycling of residue is controlled to secure equilibrium where the acetic acid in the final residue is in the range between 1 and 5%, and subsequently combining the second distillate in which the aromatic constituents are concentrated with the residue of the first fractionation in which acetic acid is concenrated.

References Cited in the file of this patent

UNITED STATES PATENTS

| | | |
|---|---|---|
| 1,698,798 | Legendre | Jan. 15, 1929 |
| 2,224,926 | Potts et al. | Dec. 17, 1940 |
| 2,479,745 | Homiller et al. | Aug. 23, 1949 |
| 2,513,813 | Milleville | July 4, 1950 |
| 2,595,805 | Morrell et al. | May 6, 1952 |
| 2,617,757 | Michael | Nov. 11, 1952 |
| 2,672,435 | Shoptaw | Mar. 16, 1954 |
| 2,758,071 | Biribauer | Aug. 7, 1956 |